US008328424B2

(12) United States Patent
Seim et al.

(10) Patent No.: US 8,328,424 B2
(45) Date of Patent: Dec. 11, 2012

(54) BEARING

(75) Inventors: Lars Seim, Espeland (NO); Ketil Bøe, Fana (NO); Vidar Åsmul, Os (NO)

(73) Assignee: FRAMO Engineering AS, Bergen (NO)

( * ) Notice: Subject to any disclaimer, the term of this patent is extended or adjusted under 35 U.S.C. 154(b) by 417 days.

(21) Appl. No.: 12/529,703

(22) PCT Filed: Mar. 3, 2008

(86) PCT No.: PCT/NO2008/000079
§ 371 (c)(1),
(2), (4) Date: Apr. 26, 2010

(87) PCT Pub. No.: WO2008/108658
PCT Pub. Date: Sep. 12, 2008

(65) Prior Publication Data
US 2010/0209030 A1 Aug. 19, 2010

(30) Foreign Application Priority Data
Mar. 2, 2007 (NO) .................................... 20071187

(51) Int. Cl.
*F16C 27/06* (2006.01)
*B23P 19/04* (2006.01)
(52) U.S. Cl. ...... 384/223; 384/119; 384/219; 29/402.08
(58) Field of Classification Search .................. 384/119, 384/198, 215, 219, 220, 223, 295–296
See application file for complete search history.

(56) References Cited

U.S. PATENT DOCUMENTS

| 2,763,379 | A | | 4/1954 | Danielson | |
|---|---|---|---|---|---|
| 3,960,417 | A | | 6/1976 | Kraus | |
| 3,972,572 | A | | 8/1976 | Hohn | |
| 4,286,827 | A | | 9/1981 | Peterson et al. | |
| 4,921,229 | A | * | 5/1990 | Hori | 384/220 |
| 5,181,784 | A | * | 1/1993 | Jordens et al. | 384/223 |
| 5,356,226 | A | * | 10/1994 | Onishi et al. | 384/119 |
| 5,669,718 | A | * | 9/1997 | Sakairi et al. | 384/215 |
| 5,683,184 | A | * | 11/1997 | Striedacher et al. | 384/223 |
| 5,911,511 | A | | 6/1999 | Saville | |
| 6,263,822 | B1 | * | 7/2001 | Fontenot et al. | 114/230.12 |
| 6,435,757 | B1 | * | 8/2002 | Casella | 384/222 |
| 2002/0159660 | A1 | * | 10/2002 | Tatura | 384/220 |
| 2003/0002760 | A1 | | 1/2003 | Tatsumura | |
| 2009/0202184 | A1 | * | 8/2009 | Franke et al. | 384/220 |

FOREIGN PATENT DOCUMENTS

| DE | 1 163 165 | 2/1964 |
|---|---|---|
| GB | 504598 | 4/1939 |
| GB | 547389 | 8/1942 |
| JP | 2000-266118 | 9/2000 |

* cited by examiner

*Primary Examiner* — Marcus Charles
(74) *Attorney, Agent, or Firm* — Merchant & Gould P.C.

(57) ABSTRACT

A resilient (slide) bearing device, for example for use in connection with support of a rotating element in a vessel, where the bearing insert comprises devices for gradual absorption of loads to which the bearing is exposed. This is achieved by the devices for gradual absorption of loads comprising two or more elastic elements with different modulus of elasticity, where the elements are furthermore placed in layers. A method for maintenance and service of the device is also presented.

13 Claims, 4 Drawing Sheets

BEARING

CROSS REFERENCE TO RELATED APPLICATIONS

Figure 1:
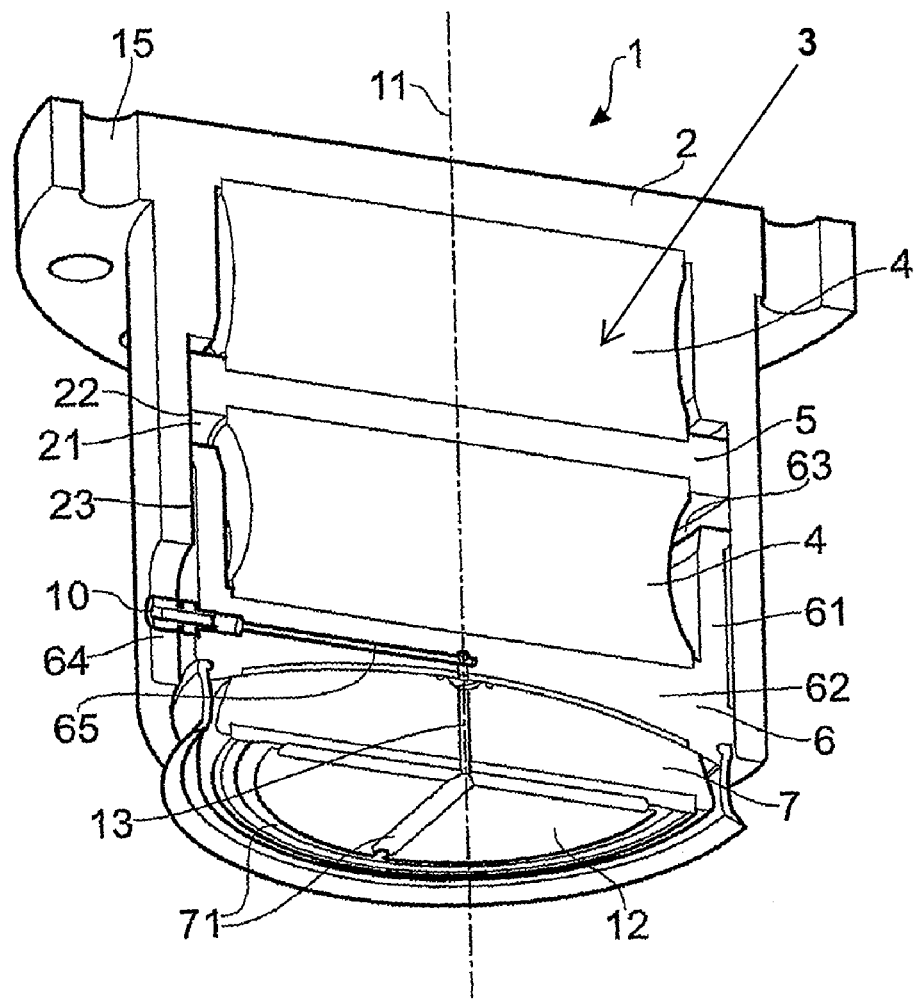

This application is a National Stage Application of PCT/NO2008/000079, filed 3 Mar. 2008, which claims benefit of Serial No. 20071187, filed 2 Mar. 2007 in Norway and which applications are incorporated herein by reference. To the extent appropriate, a claim of priority is made to each of the above disclosed applications.

THE FIELD OF THE INVENTION

The present invention relates to a resilient (slide) bearing device, which is used in connection with support of large, heavy and rotating elements. This may involve, for example, support of a turret in a vessel, support of a crane or bridge, etc. where external influences expose the bearings to great dynamic stresses.

PRIOR ART

A bearing is generally defined as a device for positioning one element relative to another in such a manner that relative movement between the elements is possible. The elements have respective bearing surfaces which are in contact with each other.

The bearing surfaces will normally be covered by a lubricant which is used in order to facilitate the relative movement between the elements, reduce the wear on the bearing surfaces, reduce corrosion, etc. Bearings and bearing surfaces are chosen by determining the mechanical movement and function they have to fulfil, their working life and reliability as well as the existing conditions such as temperatures, any pollution, corrosion risk, vibrations, cyclical loads etc.

Of special interest are slide bearings, where the bearing surfaces of the bearing elements are usually divided by a lubricant which forms a thin film. The lubricant may be various types of oil and/or fat. The term slide bearings covers a wide range of bearing devices in which the relative movement of the bearing elements involves a sliding movement of one bearing surface over the other bearing surface.

Different materials are used for slide bearings, and particularly in the bearing surfaces, including metals such as various cast iron alloys, steel alloys, aluminium alloys, copper alloys and many other metals, engineering plastics of different types, including both thermoplastics and thermosetting plastics, various glass or ceramic materials, wood and many other materials.

Bearings are generally employed in order to absorb loads and/or support one or more elements. The element may be rotating, for example a rotating shaft, or it may be fixed, for example a bridge or the like. A bearing may also be designed to be able to absorb both axial and radial forces. The bearing type must be chosen on the basis of what it has to be used for.

If there are large loads in a structure, where there has to be a movement between elements therein, and where external influences result in fluctuating loads in the structure and its bearings, slide bearings, for example, may be employed. A slide bearing is composed of a bearing surface which may be made of a metal, an alloy or a synthetic material. The bearing must be designed so as to be capable of withstanding the highest stresses, even though these stresses are of short duration. The result of this, however, is that the bearing does not function optimally, since on one hand it must be able to tolerate peak loads (which occur for short periods at a time), and for the rest of the time must be able to absorb the normal loads. If the material employed in the bearing is too "stiff", it will not work with lower loads; the opposite will occur if the material is too "soft", as it will then be unable to absorb the large, short-duration peak loads. As a compromise, therefore, a material will be chosen which is "medium hard", and which will be functional all the time and consequently also subject to greater wear.

The use is also known of various types of devices for supporting a turret on a vessel, for example a Floating Production, Storage and Offloading Vessel (FPSO), where these may be slide bearings, roller bearings or wheel suspension. These have been large, expensive and complicated solutions, which have only partly fulfilled the task they were set to perform. A vessel of this type can be exposed to substantial wind, current and wave influences, which can result in dynamic deformations in the hull and thereby also in bearings and bearing surfaces.

An object of the present invention will therefore be to provide a bearing which can absorb both normal and large, fluctuating loads, where at the same time wear on the bearing surfaces is reduced over time. It is a further object to provide a bearing which is easy and cheap to produce as well as a bearing on which it is easy to carry out service/maintenance. It is also desirable to provide a bearing in which an attempt is made to avoid or at least reduce the drawbacks of existing bearings.

These objects are achieved with a bearing according to the attached claims, where further details of the invention will be apparent from the following description.

SUMMARY

A bearing according to the invention is particularly intended for use in connection with support of a turret on board a vessel, but it may also be employed in connection with support of other large, heavy and rotating elements, where a resilient slide bearing has to be capable of absorbing the varying loads which will exist over the bearing during the rotating motion. For support of a turret, a plurality of bearings according to the invention may be arranged in a circle in order to support the turret in the rotating motion.

The bearing according to the invention is a spring slide bearing. It comprises a housing and in relation thereto a relatively movable abutment surface connected to a bearing insert. According to the invention the bearing insert comprises two or more elastic elements with different modulus of elasticity mounted behind one another viewed in the length of a centre axis of the bearing housing and devices for gradual absorption of loads to which the bearing is exposed. The term centre axis for the bearing housing should be understood here to mean an axis extending from the abutment surface into the housing, having an orientation substantially perpendicular to the abutment surface. By constructing the bearing insert and devices for gradual absorption of loads in this manner, the softest elastic element will absorb the lowest loads, while the extreme loads will be absorbed by the hardest elastic element, on account of the bearing's internal design.

The elastic elements may be mounted in the bearing housing with at least one distance piece between the elastic elements, viewed in the direction of the centre axis. The bearing comprises devices which permit the distance piece to have a restricted movement relative to the housing, thereby achieving the gradual absorption of the loads. In the area round the location of one or more of the distance pieces, the inside of the bearing housing may be provided with through-going openings, or internal cut-outs or the like which permit the distance piece to move relative to the housing internally in the opening or the cut-out and where at least an edge of the opening or the cut-out will act as a physical barrier to the distance piece's or pieces' movement, thereby stopping further compression of the bearing or of the bearing insert's elastic elements. By means of their space and/or the shape of an edge of the distance piece, these openings and/or cut-outs will also permit the distance piece to be angled relative to the centre axis for the housing. When the bearing is exposed to large loads, the softest elastic element, on account of the load to which it is exposed, will firstly be compressed a permitted amount, but denied further compression as a restricting body, on account of the same load, is brought into engagement with a distance piece, which by means of this cooperation between the distance piece and the restricting element, stops further compression of the elastic element. If the bearing is now exposed to further loads, where these loads are greater than the loads which hitherto have compressed the softest elastic element, the restricting body will cooperate with the distance piece, transferring the load forces to a harder elastic element without further loading of the softer elastic element. Such a construction can be employed for two or more stages of elastic elements, thereby achieving a gradual absorption of the load forces, where the hardest elastic element absorbs the greatest forces without unnecessary loading on any elastic elements which are softer than this. In an embodiment the restricting body may be a sleeve loosely arranged between the abutment surface and a distance piece or between two distance pieces, or alternatively it may be provided as a part of the element forming the abutment surface, or as a further alternative as a part of the distance piece or a combination thereof. The restricting body may furthermore be a whole annular sleeve, or rods or another rigid structure which stops further compression of an elastic element.

The bearing according to the invention may further comprise a force transfer element mounted between or as a part of the abutment surface of the bearing and the elastic elements. In this embodiment the abutment surface is composed of a surface of the force transfer element. This force transfer element may comprise several separate elements assembled to form a unit and may be designed so as to absorb any angular deviation to which the bearing is exposed. This may be achieved, for example, by providing between two relatively movable elements of the force transfer element a partly spherical joining surface. The force transfer element, moreover, may also be arranged to permit lubrication of the bearing surface by lubricating devices mounted in the force transfer element or to release the entire bearing from the support surface.

The elastic elements may advantageously be elastomers, springs, compressible fluids or a combination thereof. The elastic elements may advantageously be placed in layers across the housing's centre axis, divided by at least one distance piece, where the distance piece may be a disc of a circular, square or rectangular shape, and where the disc may furthermore be solid, hollow/annular, latticed, etc. The disc may moreover be provided with partly spherical edges in order to permit tilting of the disc. These spherical edges may cooperate with cut-outs or openings in the housing to permit tilting of the distance piece. One cut-out may be provided per distance piece in the housing with identical or different shapes.

The bearing according to the invention will furthermore be able to be used both as an axial bearing and a radial bearing, or a combination thereof. The movement between the elements provided by the bearing according to the invention can be facilitated by means of the bearing's lubricating devices, where these devices may also be employed for hydrostatic release of the bearing. The lubricant will also be able to reduce the wear on the bearing surfaces.

Another advantage of the bearing in the present invention is the simple and uncomplicated way of carrying out maintenance/service, wherein the bearing is attached from its top by means of suitable fastening devices to the element it is to support, where top should be understood here to refer to the side of the housing facing away from the bearing surface; during maintenance or service the fastening devices will be easily removed, whereupon the bearing housing can be removed. The bearing insert will thereby be uncovered, and, for example, the elastic element which is worn can be replaced; alternatively it may also be envisaged that "the degree of hardness" of one or more of the elastic elements has to be replaced, which means that only this or these elastic elements are replaced, while the remaining elements in the bearing continue to be used.

Thus by means of the present invention a bearing is provided which absorbs the varying loads to which it is exposed in a better fashion than previously known solutions, in addition to which the bearing's life is extended on account of the design and where the bearing provides far greater flexibility as far as service, maintenance and reuse are concerned.

Other advantages and special features of the subject of the present invention will become clear from the following detailed description, the attached drawings and the following claims.

A BRIEF DESCRIPTION OF THE ATTACHED DRAWINGS

Figure 2:
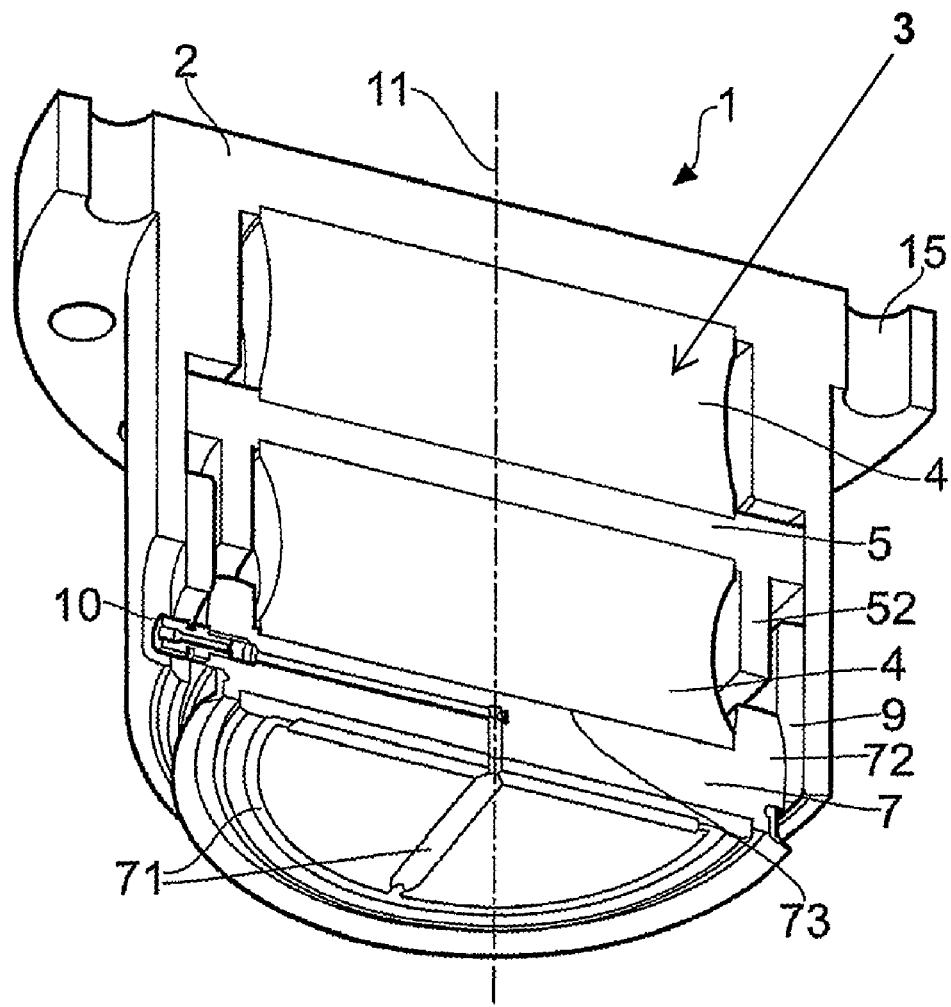
Figure 3:
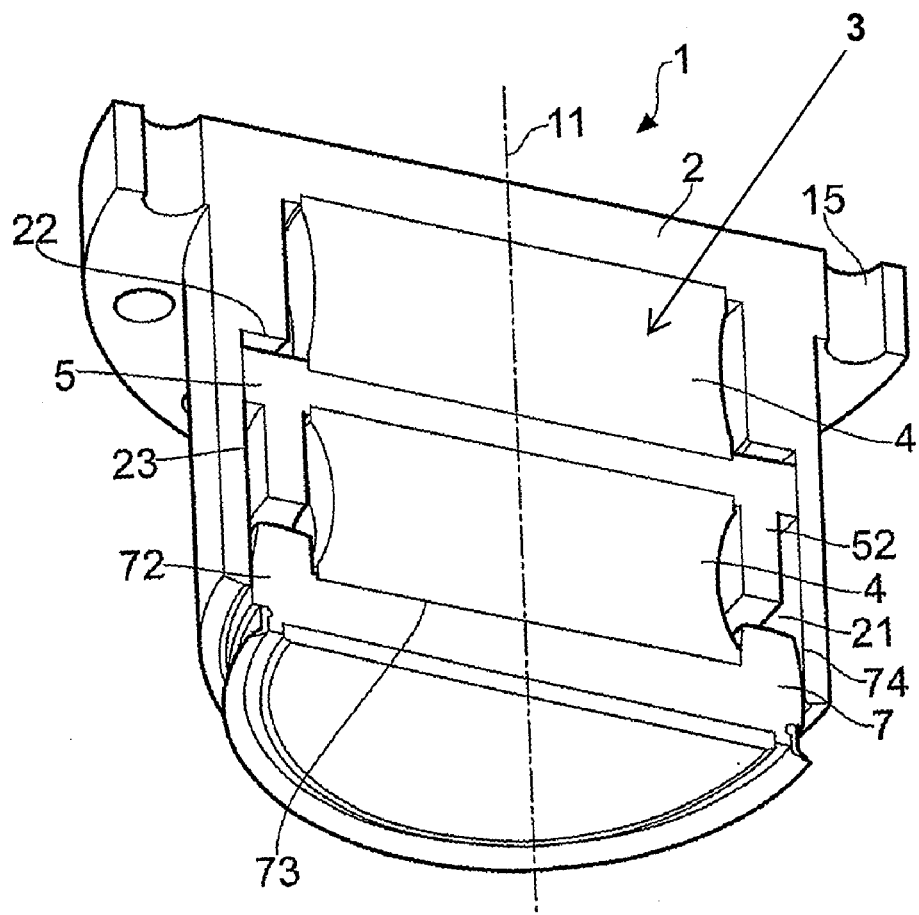
Figure 4C:
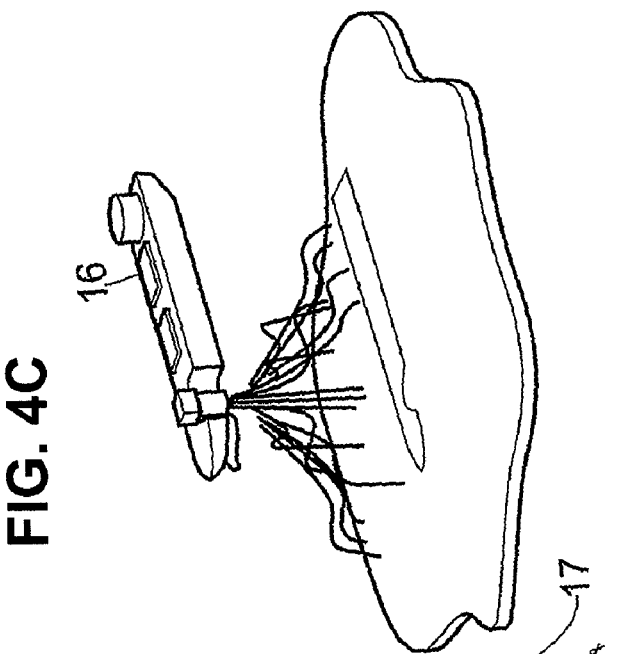
Figure 4A:
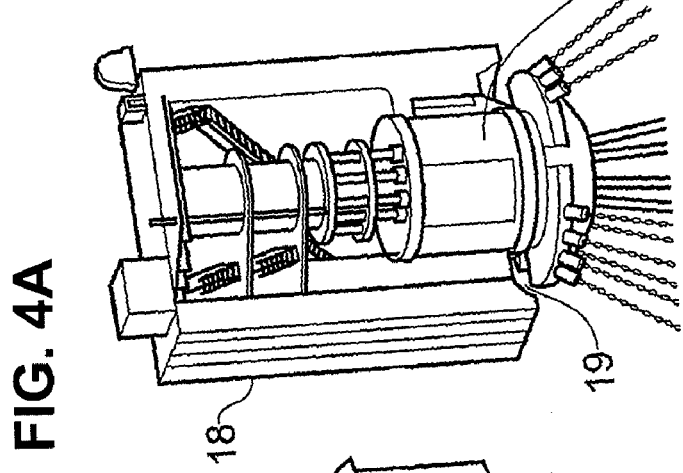
Figure 4B:
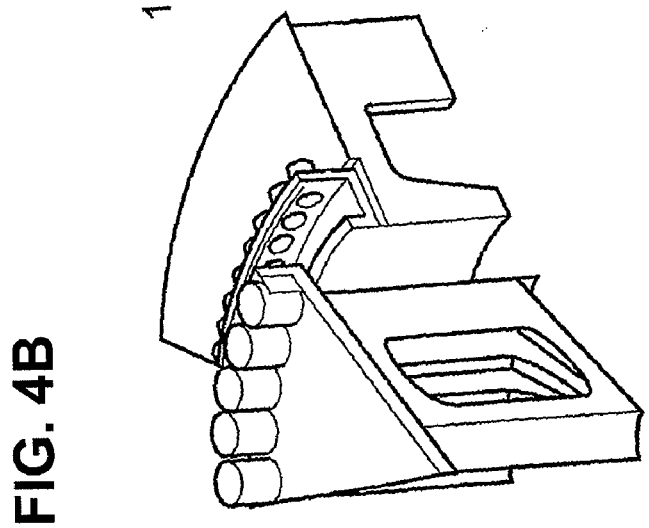

FIG. 1 is an exploded view of a bearing according to a first embodiment of the invention, FIG. 2 is an exploded view of a bearing according to a second embodiment of the invention, FIG. 3 is an exploded view of a bearing according to a third embodiment of the invention, FIG. 4A is a side perspective view of the bearing mounted in a turret on board a vessel, FIG. 4B is a partial enlarged view of FIG. 4A, and FIG. 4C is a partial enlarged view of FIG. 4A.

DETAILED DESCRIPTION

In FIG. 1 the invention is illustrated according to a first embodiment, where a resilient bearing 1 comprises a housing 2 with an axial centre axis 11, wherein a bearing insert 3 is mounted in the housing 2. The bearing insert 3 comprises devices 4, 5, 6, 7 for gradual absorption of the loads to which the bearing 1 is exposed from an abutment surface 12. The housing 2 covers the bearing insert 3 on all sides except the side comprising the abutment surface 12. The housing 2 may be closed in its surface, with the result that the bearing insert 3 is completely covered from the environment or more open, with the result that it forms a support structure round the bearing insert 3 but does not cover it. The housing 2 is secured to an element, a turret 17 (see also FIG. 4), and abutment surface 12 abuts against the second element, a vessel 16 (see also FIG. 4), which has to be moved relative to the first element, in this case by relative rotation. An opposite configuration is also possible with the housing 2 secured to the second element, a vessel 17, and where the abutment surface 12 abuts against the first element, the turret 17, or a combination of these configurations. In the example illustrated in FIG. 1, the bearing insert 3 comprises two elastic elements 4, which are located in layers across the housing 2 centre axis 11. These elastic elements 4 may be made of any kind of suitable material, but are preferably elastomer(s), springs(s), compressible fluids, etc., or also a combination thereof.

A force transfer element 7 in FIG. 1, arranged between the abutment surface 12 and the elastic elements 4, is provided on the side facing away from the abutment surface 12 with a partly spherical surface, which abuts against a complementarily shaped surface in a restricting body 6. The special design of these surfaces permits the bearing surface 12, which is a part of the force transfer element 7, to be subjected to tilt or angular deviation relative to the centre axis 11 for the bearing without the elastic elements 4 being subjected to corresponding angular deviation. The force transfer element 7 is further provided with a supply duct 13 for lubrication or hydrostatic release of the bearing surface 12.

From FIG. 1 it can be seen that the restricting body 6 is in the form of a sleeve 61 with a bottom part 62, these together forming an internal cavity 63 in the restricting body 6, wherein one of the elastic elements 4 is mounted. In the restricting body's 6 bottom part 62 there is a lubricating or release device 10 comprising a supply opening 64 provided at an outside of the restricting body 6, leading to a supply duct 65; this device cooperates with the supply duct 13 in the force transfer element 7, thereby enabling lubricant to be applied to the bearing surface 12, or the device 10 also to be used for hydrostatic release of the entire bearing 1.

The two layers of elastic elements 4 are separated by a distance piece 5, which together with the restricting body 6 is intended to restrict the compression of the softest element 4 in a manner which will be explained in greater detail below.

On its inside, in the area round the distance piece 5 position, the bearing housing 2 is provided with a cut-out 21. The alternative to a cut-out will be to provide the housing 2 with through-going holes/openings. The object of this design is to stop further compression of the bearing insert 3 when it is subjected to what has been determined to be the maximum load for the bearing. If the bearing 1 is exposed to large loads, the softest elastic element 4 (in the figure this corresponds to the elastic element 4 mounted closest to the bearing surface 12) will first begin to be compressed. The element is permitted to be compressed until the restricting body 6 is brought into contact with the distance piece 5, and the hardest elastic element 4, which in the figure abuts against the distance piece 5 upper side, will not be compressed by this load. When the softest elastic element 4 has been compressed to such an extent that the restricting body 6 is brought into contact with the distance piece 5, no further compression of the softest elastic element will occur. If the bearing is not exposed to greater loads, only the softest element 4 will be functional, and this will be the case for the greater part of the bearing 1 life.

However, when the bearing 1 is exposed to additional loads, i.e. greater than those mentioned above, the hardest elastic element 4 will begin its compression. This takes place by the loads being transferred by means of the force transfer element 7 via the restricting body 6 to the distance piece 5, where, on account of the earlier maximum compression of the softest elastic element, these three elements are now moved as a collective unit, thereby transferring the pressure forces to the hardest elastic element 4. This compression will, however, be restricted, even after a permitted maximum travel, by the distance piece 5 being stopped by an edge 22 of the cut-outs 21 inside the bearing housing 2.

The distance piece 5, moreover, may be provided with partly spherical lateral edges, which may permit a certain amount of tilting of the member 5 relative to the housing 2.

The elastic element 4 spring properties (modulus of elasticity) is determined on the basis of the loads to which the structure may be exposed in addition to any other parameters which may influence these properties, where this results in the softest elastic element 4 having a spring characteristic which will be capable of absorbing the normal loads for most of the time (typically 85-95% of the time), while the hardest elastic element will be selected on the basis of the extreme loads (for example in the event of a storm) to which the bearing is exposed, and where this results in the hardest elastic element 4 being functional only for infrequent and short periods at a time.

In the restricting body 6 devices 10, 65 are provided for lubricating and/or releasing the bearing. The lubricant may be any kind of suitable material, from fluids such as water, oil, soap, fat and air to solids such as graphite, molybdenum, polytetrafluorethylene (PTFE), etc. The force transfer element 7 abutment surface 12 is provided with a groove 71 leading out from the supply duct 13, thereby facilitating the spreading of the lubricant over the abutment surface 12 contact area.

It may also be possible to attach (not shown) the force transfer element 7 to the restricting body 6 by means of spring devices, which permit tilt to be absorbed.

As can be seen in FIG. 1, the bearing 1 is provided with through-going openings 15 for attachment of the bearing 1 to one of the elements, the turret 17 or vessel 16 respectively, where these may be bolts, etc.

In FIG. 2 a second embodiment of the bearing 1 according to the invention is illustrated, where this also comprises a housing 2, in which housing a bearing insert 3 is mounted. In a similar manner to the first embodiment, two elastic elements 4 are arranged in layers across the housing 2 centre axis 11.

In this case too one or more distance pieces 5 will be mounted between the elastic elements 4, in order together with the force transfer element 7 and the restricting element, which in this case forms a part of the distance piece 5, to restrict the movement of the softest element 4. As a result of the above, the distance piece 5 will be provided with walls 52 extending in the bearing's 1 axial direction towards the abutment surface 12, where these walls 52 collaborate with collaborating walls 72 (see also FIG. 3) in the force transfer element 7 extending in the axial direction towards the distance piece 5, thus enabling the restricting body 6 to be omitted. It should also be noted that on the side facing away from the abutment surface, the force transfer element 7 in this embodiment is flat, forming a surface 73 (see also FIG. 3) for abutment against an elastic element 4 which together with the walls 72 forms a cavity for secure placement of the elastic element 4, and in addition that the surface of the force transfer element facing radially outwards as well as the outer walls 74 (see also FIG. 3) in the element are partly spherical in shape. This partly spherical construction of the outer walls 74 permits angling of the abutment surface 12 relative to the centre axis 11 to be directly absorbed by the softest elastic element 4.

The figure further shows that a sleeve 9, provided between the housing 2 and the distance piece 5/the force transfer element 7 will be capable of absorbing radial forces to which the bearing 1 is exposed, the sleeve 9 being designed on its inside complementarily to the partly spherical walls in the force transfer element 7.

Yet another embodiment of the bearing according to the invention is illustrated in FIG. 3, where the intermediate and freely rotating sleeve 9 is removed. In this case the force transfer element 7 is instead provided with such a large diameter that it abuts against an inner wall 23 of the housing 2. In this case too the force transfer element 7 lateral surfaces are provided as partly spherical surfaces 74, where this will permit the element 7 to be allowed an angular deviation or tilt, which will be able to be absorbed by the elastic element 4 located within. The force transfer element 7 is further provided with walls 72 extending in the bearing 1 axial direction.

In a similar manner to the bearing 1 second embodiment, in this embodiment too the distance piece 5 lateral edges will be provided with partly spherical surfaces and the walls 52 extending in the bearing 1 axial direction towards the force transfer element 7.

It should be understood that the walls 52, 72, which are brought into contact with each other during compression of, for example the softest elastic element 4, and which in this embodiment are composed of the distance piece 5 and the force transfer element 7, and which form the restricting body 6, may be provided as a part of the respective piece/element, or they may be provided as free-standing elements which are placed between them.

In FIGS. 4A-4C, the bearing 1 according to the invention is illustrated employed on board a vessel 16 (only a few portions are shown), where a turret 17 (only partly shown) has to be mounted rotatably in the vessel 16. The vessel hull 18 is provided with a through-going opening 19 for receiving the turret 17, where slide bearings 1 are arranged in the contact surfaces between them 16, 17. In order to restrict the turret's motion, in the hull there is provided an annular path with vertical walls which interact with corresponding vertical walls on the turret. As can be seen from the drawing, a number of radial bearings 1 are mounted on the hull's vertical walls, while inside the turret's vertical walls are mounted a number of bearings 1 in order to absorb axial loads. The bearings 1 are illustrated here in a circular form, arranged so that together they form an annulus, but they may assume any other form whatever.

The invention has now been explained by some non-limiting embodiments. A person skilled in the art will appreciate that it will be possible to carry out a number of variations and modifications to the devices as described within the scope of the invention as it is defined in the attached claims. A bearing may, for example, be designed in three or more layers with elastic elements in the direction of the bearing's centre axis.

The invention claimed is:

1. A resilient bearing device in support of a turret on board a vessel, which bearing comprises an abutment surface connected to a bearing insert mounted in a housing with an axial centre axis, for absorption of forces acting on the abutment surface, wherein the bearing insert comprises devices for gradual absorption of loads to which the bearing is exposed, wherein the devices comprise two or more elastic elements with different modulus of elasticity, viewed in the direction of the centre axis of the housing, wherein the devices further comprise a force transfer element arranged between the abutment surface and the elastic elements, and being provided on the side facing away from the abutment surface with a partly spherical surface, which abuts against a complementarily shaped surface in a restricting body, thereby permitting the bearing surface, to be subjected to tilt or angular deviation relative to the centre axis for the bearing without the elastic elements being subjected to corresponding angular deviation;
wherein at least one restricting body stops the compression of an elastic layer; and
wherein the restricting body is composed of at least one element mounted between the abutment surface and a distance piece and restricts movement of the abutment surface and the distance piece in a direction towards each other.

2. A device according to claim 1, wherein the elastic elements are placed in layers across the housing's centre axis, divided by at least one distance piece.

3. A device according to claim 2, wherein the bearing comprises at least one elastic element oriented in a direction substantially parallel to the centre axis.

4. A device according to claim 3, wherein the layer of elastic elements with the greatest modulus of elasticity is placed nearest the bearing's abutment surface.

5. A device according to claim 3, wherein the layer of elastic elements with the least modulus of elasticity is placed nearest the bearing's abutment surface.

6. A device according to claim 1, wherein the distance piece comprises devices which permit angling of the distance piece relative to the housing.

7. A device according to claim 1, wherein the bearing comprises an intermediate sleeve placed between the inside of the bearing housing and the outside of the distance piece and the force transfer element.

8. A device according to claim 1, wherein the restricting body is a sleeve, one end of which abuts against the force transfer element and the opposite end abuts against the distance piece.

9. A device according to claim 1, wherein the force transfer element is connected to the restricting body by means of spring devices.

10. A device according to claim 1, wherein the force transfer element, wherein the abutment surface being a part of the force transfer element, is permitted a tilt of up to 5°.

11. A device according to claim 1, wherein the force transfer element's tilt is absorbed by one or more layers of the elastic elements.

12. A method for maintenance and service of the device according to claim 1, wherein the method comprises the following steps:
loosening the bearing housing's bolts,
removing the whole bearing housing with the insert for replacement of the whole bearing, or
removing one or more of the bearing insert's parts.

13. A device according to claim 1, wherein the distance piece and the housing comprises devices which permit angling of the distance piece relative to the housing.

* * * * *